(12) United States Patent
Yazici

(10) Patent No.: US 12,618,363 B2
(45) Date of Patent: May 5, 2026

(54) BIFURCATION AIR SCOOP FOR GAS TURBINE ENGINE

(71) Applicant: Raytheon Technologies Corporation, Farmington, CT (US)

(72) Inventor: Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 199 days.

(21) Appl. No.: 18/354,080

(22) Filed: Jul. 18, 2023

(65) Prior Publication Data

US 2025/0146439 A1 May 8, 2025

(51) Int. Cl.
*F02C 7/057* (2006.01)
*B64D 13/02* (2006.01)
B64D 13/06 (2006.01)

(52) U.S. Cl.
CPC .............. *F02C 7/057* (2013.01); *B64D 13/02* (2013.01); *B64D 2013/0618* (2013.01)

(58) Field of Classification Search
CPC .......... F05D 2260/606; F05D 2250/51; B64D 2013/0618; B64D 13/02; F02C 7/057; F02C 7/141; F02C 6/08
See application file for complete search history.

(56) References Cited

U.S. PATENT DOCUMENTS

| | | | | |
|---|---|---|---|---|
| 5,203,163 A | * | 4/1993 | Parsons | F02C 6/08 |
| | | | | 60/785 |
| 5,918,458 A | * | 7/1999 | Coffinberry | F02C 7/185 |
| | | | | 60/785 |

| | | | | |
|---|---|---|---|---|
| 9,803,546 B2 | | 10/2017 | Willie et al. | |
| 10,982,551 B1 | * | 4/2021 | Atkins | F01D 5/30 |
| 12,180,898 B1 | * | 12/2024 | Kupratis | F02C 9/18 |
| 2009/0188234 A1 | * | 7/2009 | Suciu | F02K 3/115 |
| | | | | 60/39.83 |
| 2010/0150700 A1 | | 6/2010 | Strecker et al. | |

(Continued)

FOREIGN PATENT DOCUMENTS

EP 3569841 A1 11/2019

OTHER PUBLICATIONS

European Search Report for EP Application No. 24189519.2 dated Nov. 21, 2024.

*Primary Examiner* — Rodolphe Andre Chabreyrie

(74) *Attorney, Agent, or Firm* — Carlson, Gaskey & Olds, P.C.

(57) ABSTRACT

A gas turbine engine includes a fan received within a fan case, the fan delivers bypass air into a bypass duct between an inner radial portion of the fan case and an outer radial surface of an inner core housing. The fan also delivers air into the inner core housing. A compressor section, a combustor and a turbine are within the inner core housing. A bifurcation extends radially to connect the inner core housing to the fan case. The bifurcation has a forward opening defining an air scoop. The air scoop separates air into a first airflow chamber connected downstream to a precooler. The precooler also has a connection to receive compressed air from the compressor section. The air in the bypass duct is delivered to the precooler for cooling the compressed air in the precooler. The air scoop also defines a second airflow chamber for delivering cooling air to components within the inner core housing. An aircraft supply system is also disclosed.

18 Claims, 6 Drawing Sheets

(56)                References Cited

U.S. PATENT DOCUMENTS

| 2013/0098067 | A1 |  | 4/2013 | Suciu et al. |  |
|---|---|---|---|---|---|
| 2020/0300164 | A1 |  | 9/2020 | Muldoon et al. |  |
| 2020/0325828 | A1 |  | 10/2020 | De Carne-Carnavalet et al. |  |
| 2024/0301808 | A1 | * | 9/2024 | Sobanski | F02C 3/145 |
| 2024/0309810 | A1 | * | 9/2024 | Kramer | F02C 3/30 |
| 2024/0309815 | A1 | * | 9/2024 | Mohseni | F16J 15/324 |
| 2024/0384659 | A1 | * | 11/2024 | Sobanski | F02C 7/141 |
| 2024/0392724 | A1 | * | 11/2024 | Forgette | F02C 7/06 |

* cited by examiner

BIFURCATION AIR SCOOP FOR GAS TURBINE ENGINE

BACKGROUND OF THE INVENTION

This application relates to an air scoop for supplying air for two distinct purposes from a bifurcation in a gas turbine engine.

Gas turbine engines are known, and typically include a fan delivering air into a bypass duct as propulsion air. An outer fan case surrounds the fan. The fan also delivers air into an inner core housing, and into a compressor section. The air is compressed and delivered into a combustor where it is mixed with fuel and ignited. Products of this combustion pass downstream over turbine rotors, driving them to rotate.

As known, a bifurcation extends radially between the inner core housing and the fan case to secure the two. Air is needed for a gas turbine engine for a number of reasons. As an example, the gas turbine engine may also supply air for application and use on an aircraft. In addition, cooling air is typically supplied within the inner core housing.

SUMMARY OF THE INVENTION

In a featured embodiment, a gas turbine engine includes a fan received within a fan case, the fan delivers bypass air into a bypass duct between an inner radial portion of the fan case and an outer radial surface of an inner core housing. The fan also delivers air into the inner core housing. A compressor section, a combustor and a turbine are within the inner core housing. A bifurcation extends radially to connect the inner core housing to the fan case. The bifurcation has a forward opening defining an air scoop. The air scoop separates air into a first airflow chamber connected downstream to a precooler. The precooler also has a connection to receive compressed air from the compressor section. The air in the bypass duct is delivered to the precooler for cooling the compressed air in the precooler. The air scoop also defines a second airflow chamber for delivering cooling air to components within the inner core housing.

In another embodiment according to the previous embodiment, the first airflow chamber is defined by a lip at a central lateral location within the air scoop.

In another embodiment according to the previous embodiment, the second airflow chamber defined laterally outwardly on both of two lateral sides of the lip.

In another embodiment according to the previous embodiment, the second airflow chamber is defined radially outwardly and radially inwardly of the lip.

In another embodiment according to the previous embodiment, the second airflow chamber is defined radially outwardly and radially inwardly of the lip.

In another embodiment according to the previous embodiment, the air scoop extends between a radially outer end and a radially inner end, with a first distance defined between the radially outer end and the radially inner end, and a radial distance between a radially outer end of the lip and a radially inner end of the lip being greater than half of the first distance.

In another embodiment according to the previous embodiment, a radially outer end of the second airflow chamber is spaced from a radially inner end of the second airflow chamber by a distance that is also greater than half of the first distance.

In another embodiment according to the previous embodiment, the second airflow chamber is connected into a connection receiving a valve.

In another embodiment according to the previous embodiment, the second airflow chamber is connected into a connection receiving a valve.

In another embodiment according to the previous embodiment, the second airflow chamber is connected into a connection receiving a valve.

In another featured embodiment, an aircraft air supply system includes an environmental control system for delivering air to an aircraft cabin. A fan is received within a fan case. The fan delivers bypass air into a bypass duct between an inner radial portion of the fan case and an outer radial surface of an inner core housing. The fan also delivers air into the inner core housing. A compressor section, a combustor and a turbine are within the inner core housing. A bifurcation extends radially to connect the inner core housing to the fan case. The bifurcation has a forward opening defining an air scoop. The air scoop separates air into a first airflow chamber connected downstream to a precooler. The precooler also has a connection to receive compressed air from the compressor section. The air in the bypass duct is delivered to the precooler for cooling the compressed air in the precooler. The compressed air is delivered from the precooler to the environmental control system. The air scoop also defines a second airflow chamber for delivering cooling air to components within the inner core housing.

In another embodiment according to the previous embodiment, the first airflow chamber is defined by a lip at a central lateral location within the air scoop.

In another embodiment according to the previous embodiment, the second airflow chamber defined laterally outwardly on both of two lateral sides of the lip.

In another embodiment according to the previous embodiment, the second airflow chamber is defined radially outwardly and radially inwardly of the lip.

In another embodiment according to the previous embodiment, the second airflow chamber is defined radially outwardly and radially inwardly of the lip.

In another embodiment according to the previous embodiment, the air scoop extends between a radially outer end and a radially inner end, with a first distance defined between the radially outer end and the radially inner end, and a radial distance between a radially outer end of the lip and a radially inner end of the lip being greater than half of the first distance.

In another embodiment according to the previous embodiment, wherein a radially outer end of the second airflow chamber is spaced from a radially inner end of the second airflow chamber by a distance that is also greater than half of the first distance.

In another embodiment according to the previous embodiment, the second airflow chamber is connected into a connection receiving a valve.

In another embodiment according to the previous embodiment, the second airflow chamber is connected into a connection receiving a valve.

In another embodiment according to the previous embodiment, the second airflow chamber is connected into a connection receiving a valve.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
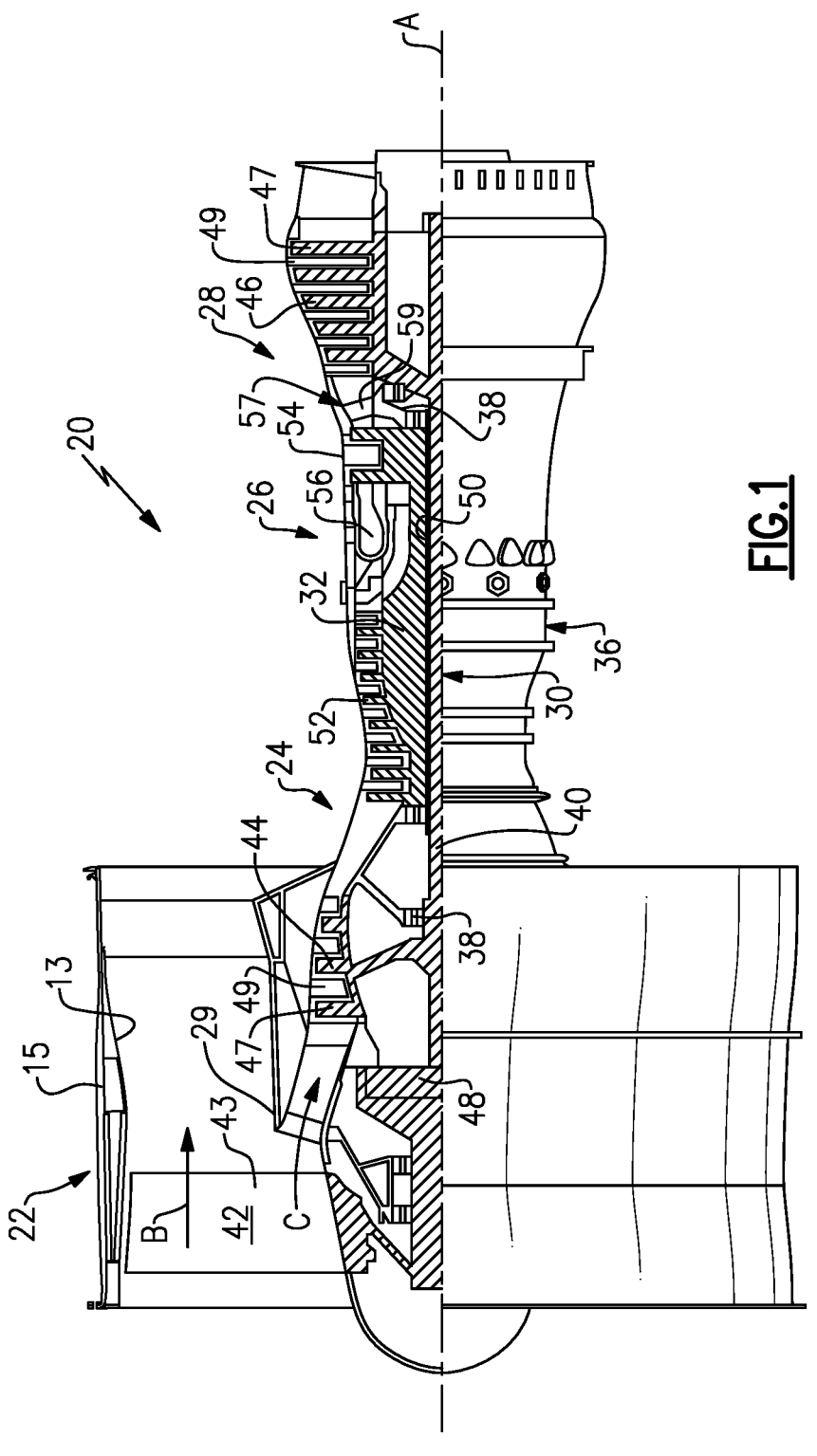
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram°R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially at most row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
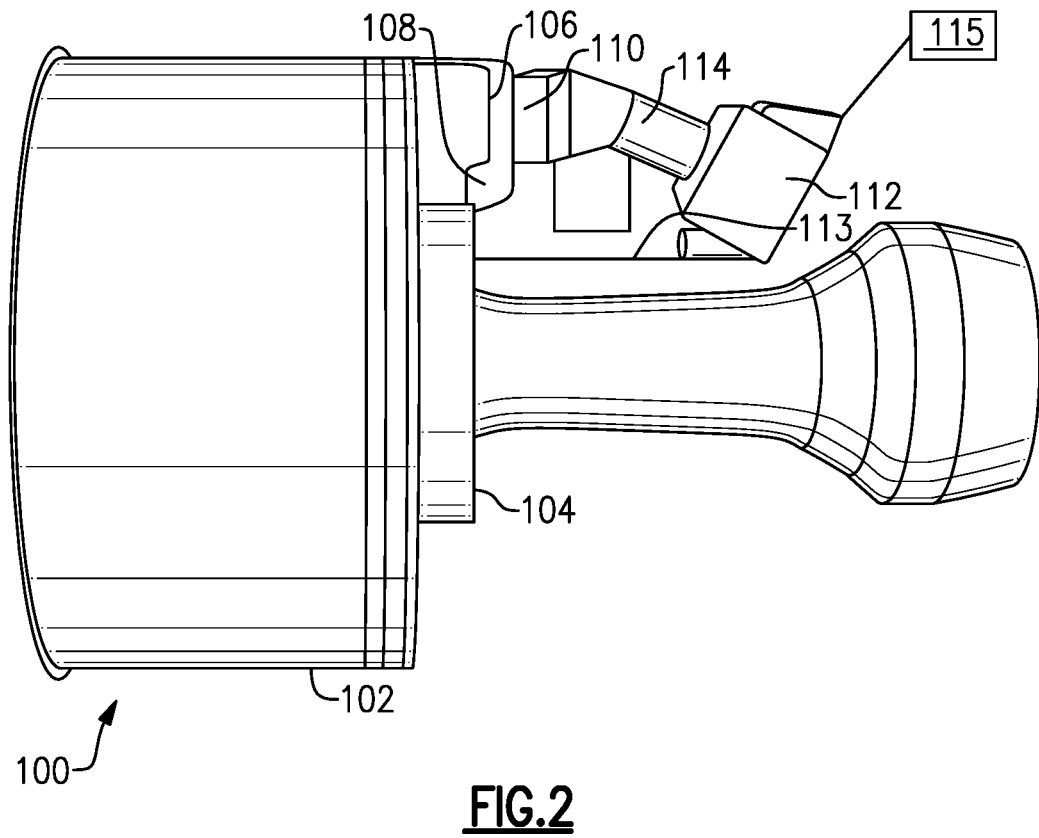
FIG. 2 shows details of a gas turbine engine.

FIG. 2 shows a gas turbine engine 100 having a fan case 102 that surrounds a fan. An inner core housing 104 surrounds a compressor section. The operation of the fan and compressor and the housings as discussed to this point may be generally as shown and described in FIG. 1.

A bifurcation 106 extends radially to connect the inner core housing 104 to the fan case 102. An air scoop 110 is positioned in the bifurcation 106 to receive air. The air scoop 110 delivers air across a precooler 112 through a conduit 114. Precooler 112 is also shown receiving a supply of air 113 such as from a compressor in the compressor section and delivering that air to a use 115 such as an environmental control system on an associated aircraft. Air is also delivered into the inner core housing 104 at 108.

Figure 3:
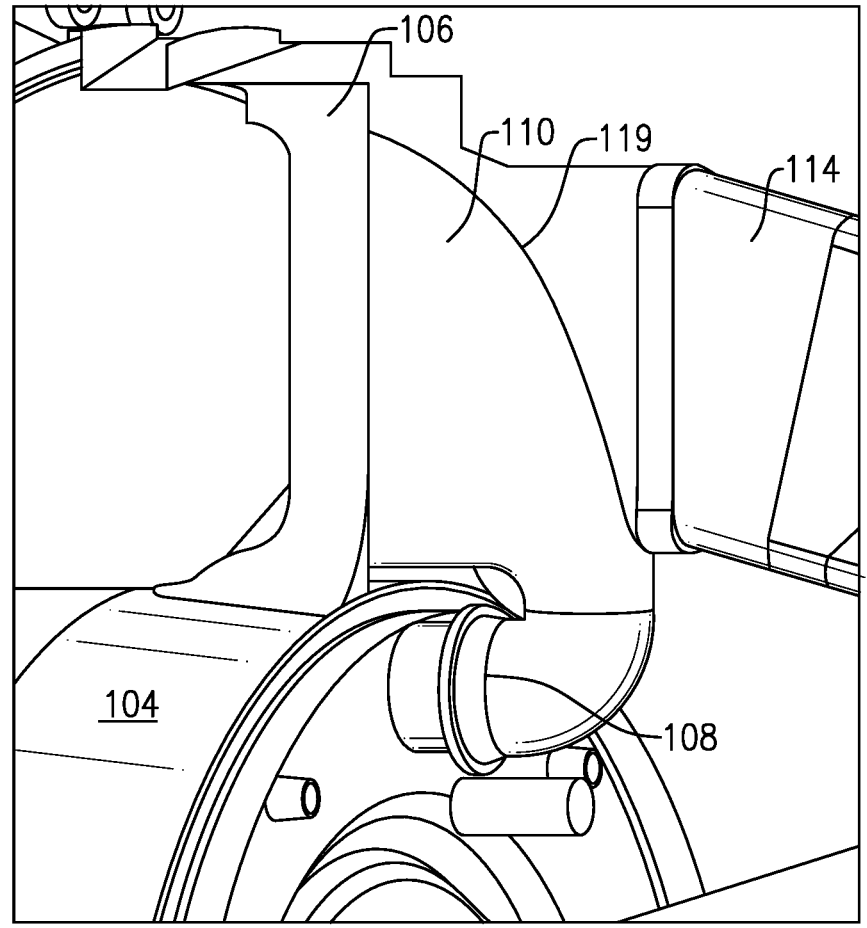
FIG. 3 shows an enlarged portion of an air scoop and bifurcation.

FIG. 3 shows a detail of the connection 108 receiving air downstream of the air scoop 110 and delivering that air into the inner core housing 104. Conduit 114 is shown extending away from the air scoop 110. As can be appreciated from FIG. 3 there are lateral enlarged portions 119 guiding the air from the air scoop 110 into the connection 108.

Figure 4:
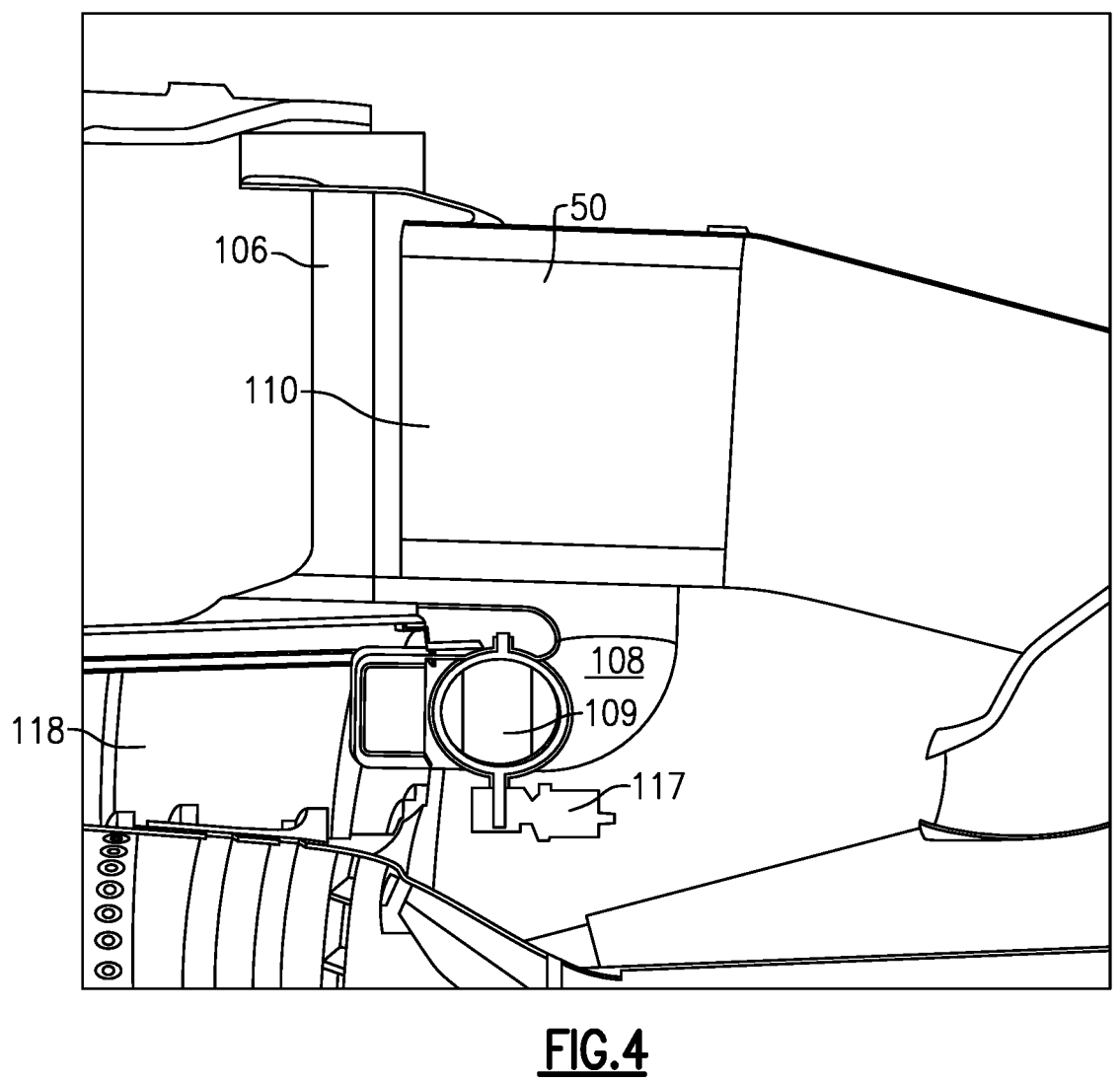
FIG. 4 shows a supply of air from the air scoop into a core engine housing.

FIG. 4 shows the connection 108 receiving a valve 109.

Figure 5B:
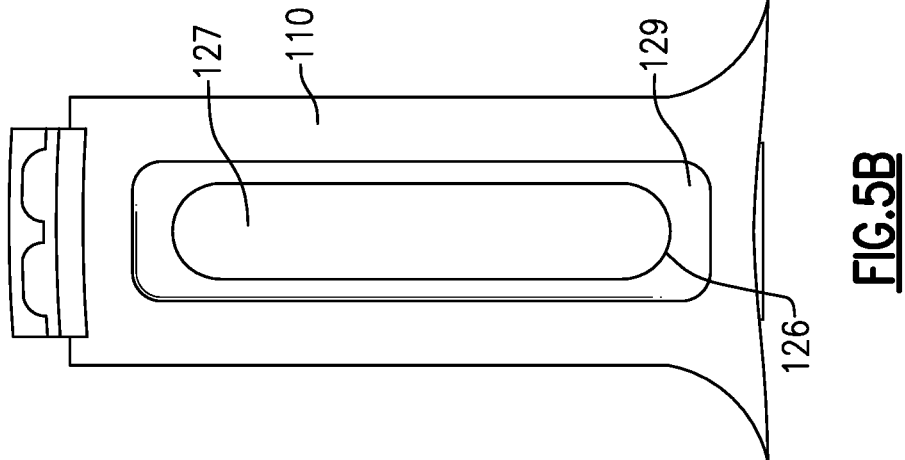
FIG. 5B shows an aft forward looking view of the air scoop.
Figure 5A:
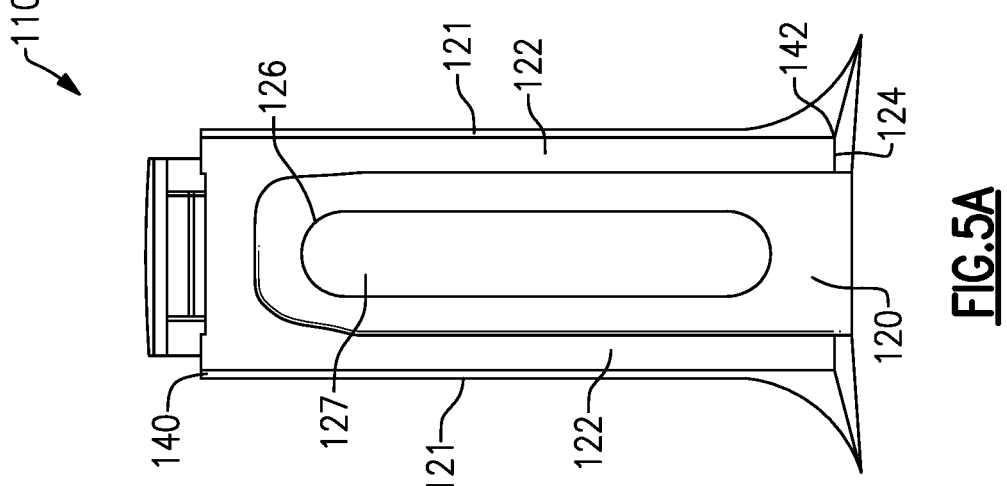
FIG. 5A shows a forward aft looking view of the air scoop.

As can be appreciated from FIG. 5A, the scoop 110 extends from a radially outer end 140 and a radially inner end 142. Side chambers 122 and a central chamber 127 extend for over a majority of a distance defined between ends 140 and 142.

Further, as can be seen, the chambers 122 have portions on each lateral side of a lip 126. The lip 126 can be seen to not extend for a radial distance as great as the radial distance of the chambers 122. A forward end 121 of the scoop 110 defines a central entrance chamber 120. Chamber 120 communicates to opposed side chamber 122. Central lip 126 defines central chamber 127. Chamber 120 also communicates with chamber 127. A radially inner end 124 of the side chambers 122 is to connected to the connection 108. Central chamber 127 is connected to the conduit 114.

As shown in FIG. 5B, central chamber 127 moves to be an enlarged chamber 129 once downstream of the lip 126.

Figure 5D:
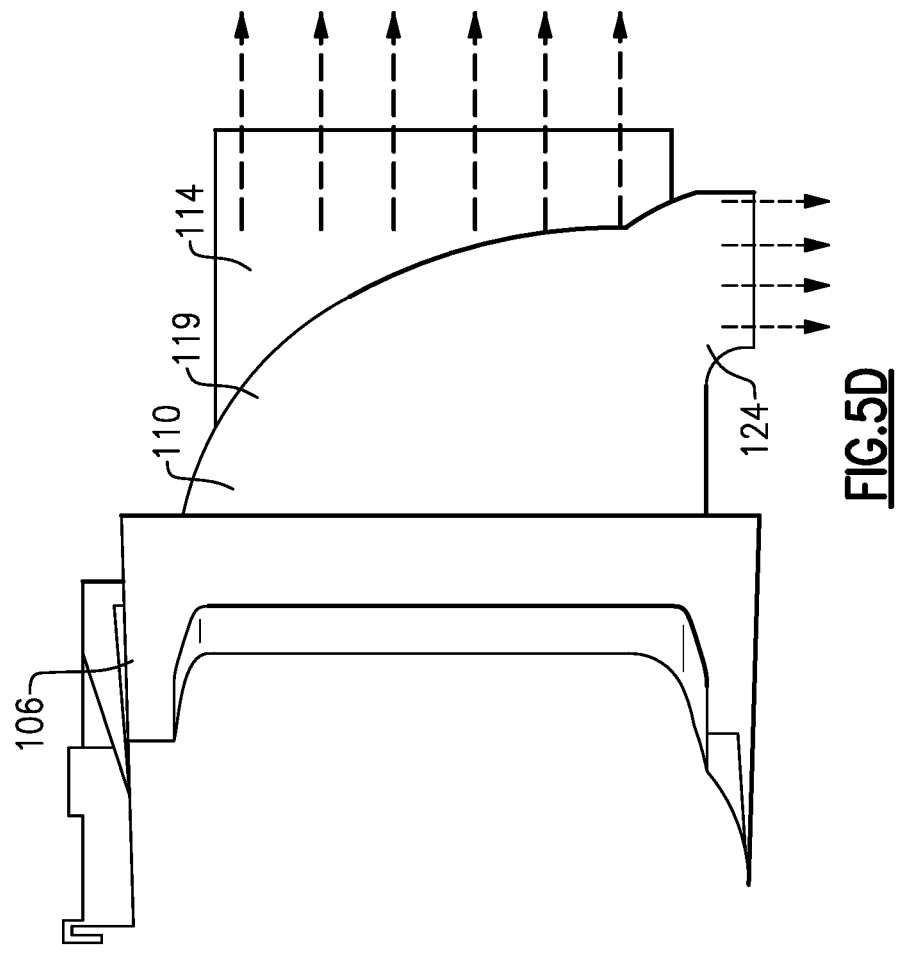
FIG. 5D shows the two separate airflows moving to downstream uses.
Figure 5C:
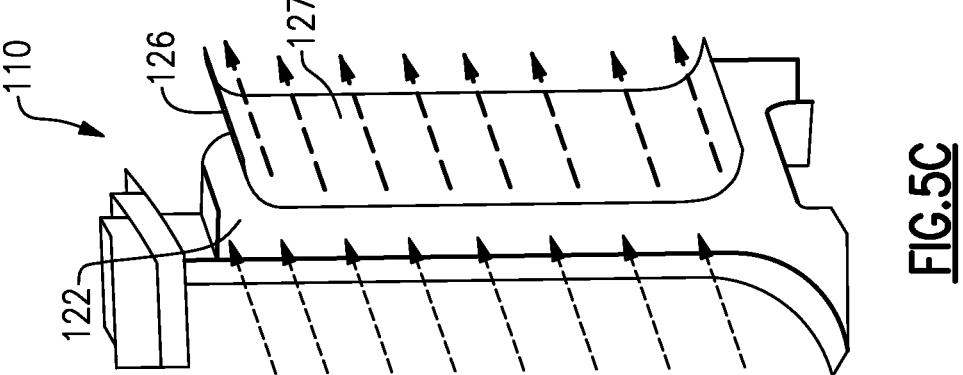
FIG. 5C shows two separate airflows within the air scoop.

As shown in FIG. 5C, the central lip 126 separates the chambers 122 and 127, air is delivered to the two connections from those two separate locations.

FIG. 5D is another view of the connection, although here without the cutaway through the middle of FIG. 5C. The sides portions 119 guide the air to connection 124 to conduit 108. The central chamber 127 is connected in the conduit 114.

In the prior art, the two scoop functions here were provided by two distinct members. By combining the two functions into a single scoop better packaging is achieved.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising: a fan received within a fan case, the fan delivering bypass air into a bypass duct between an inner radial portion of the fan case and an outer radial surface of an inner core housing, the fan delivering air into the inner core housing; a compressor section, a combustor and a turbine within the inner core housing; a bifurcation extending radially to connect the inner core housing to the fan case; the bifurcation having a forward opening defining an air scoop, the air scoop separating the bypass air into a first airflow chamber connected downstream to a precooler, the precooler having a connection to receive compressed air from the compressor section, the bypass air in the bypass duct delivered to the precooler for cooling the compressed air in the precooler; and the air scoop defining a second airflow chamber for delivering cooling air to components within the inner core housing; and the first airflow chamber is defined centrally and is separated from the second airflow chamber by a lip at a central lateral location within the air scoop.

2. The gas turbine engine as set forth in claim 1, wherein the second airflow chamber is defined laterally outwardly on both of two lateral sides of the lip.

3. The gas turbine engine as set forth in claim 2, wherein the second airflow chamber is defined radially outwardly and radially inwardly of the lip.

4. The gas turbine engine as set forth in claim 1, wherein the second airflow chamber is defined radially outwardly and radially inwardly of the lip.

5. The gas turbine engine as set forth in claim 1, wherein the air scoop extending between a radially outer end and a radially inner end, with a first distance defined between the radially outer end and the radially inner end, and a radial distance between a radially outer end of the lip and a radially inner end of the lip being greater than half of the first distance.

6. The gas turbine engine as set forth in claim 5, wherein a radially outer end of the second airflow chamber is spaced from a radially inner end of the second airflow chamber by a distance that is also greater than half of the first distance.

7. The gas turbine engine as set forth in claim 6, wherein the second airflow chamber connected into a connection receiving a valve.

8. The gas turbine engine as set forth in claim 1, wherein the second airflow chamber connected into a connection receiving a valve.

9. The gas turbine engine as set forth in claim 1, wherein the second airflow chamber connected into a connection receiving a valve.

10. An aircraft air supply system comprising: an environmental control system for delivering cabin air to an aircraft cabin; a fan received within a fan case, he fan delivering bypass air into a bypass duct between an inner radial portion of the fan case and an outer radial surface of an inner core housing, the fan delivering air into the inner core housing; a compressor section, a combustor and a turbine within the inner core housing; a bifurcation extending radially to connect the inner core housing to the fan case; the bifurcation having a forward opening defining an air scoop, the air scoop separating the bypass air into a first airflow chamber connected downstream to a precooler, the precooler having a connection to receive compressed air from the compressor section, the bypass air in the bypass duct delivered to the precooler for cooling the compressed air in the precooler; the compressed air is delivered from the precooler to the environmental control system; and the air scoop defining a second airflow chamber for delivering cooling air to components within the inner core housing; and the first airflow chamber is defined centrally and is separated from the second airflow chamber by a lip at a central lateral location within the air scoop.

11. The aircraft air supply system as set forth in claim 10, wherein the second airflow chamber defined laterally outwardly on both of two lateral sides of the lip.

12. The aircraft air supply system as set forth in claim 11, wherein the second airflow chamber is defined radially outwardly and radially inwardly of the lip.

13. The aircraft air supply system as set forth in claim 10, wherein the second airflow chamber is defined radially outwardly and radially inwardly of the lip.

14. The aircraft air supply system as set forth in claim 10, wherein the air scoop extending between a radially outer end and a radially inner end, with a first distance defined between the radially outer end and the radially inner end, and a radial distance between a radially outer end of the lip and a radially inner end of the lip being greater than half of the first distance.

15. The aircraft air supply system as set forth in claim 14, wherein a radially outer end of the second airflow chamber is spaced from a radially inner end of the second airflow chamber by a distance that is also greater than half of the first distance.

16. The aircraft air supply system as set forth in claim 15, wherein the second airflow chamber connected into a connection receiving a valve.

17. The aircraft air supply system as set forth in claim 10, wherein the second airflow chamber connected into a connection receiving a valve.

18. The aircraft air supply system as set forth in claim 10, wherein the second airflow chamber connected into a connection receiving a valve.

\* \* \* \* \*